United States Patent
Sharma et al.

(10) Patent No.: US 7,283,150 B2
(45) Date of Patent: Oct. 16, 2007

(54) FLEXIBLE MEDIA MAGNETIC PRINTING SYSTEM

(75) Inventors: Manish Sharma, Sunnyvale, CA (US); Frederick A. Perner, Santa Barbara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 440 days.

(21) Appl. No.: 10/861,047

(22) Filed: Jun. 4, 2004

(65) Prior Publication Data

US 2005/0270364 A1    Dec. 8, 2005

(51) Int. Cl.
*B41J 2/47* (2006.01)
*G03G 13/08* (2006.01)

(52) U.S. Cl. .................... 347/240; 430/120.3
(58) Field of Classification Search ............ 347/6, 347/21, 24, 43, 53, 85, 240, 251; 346/25, 346/74.4; 430/253, 258, 322, 120.3; 235/432, 235/449; 178/4.1 A
See application file for complete search history.

(56) References Cited

U.S. PATENT DOCUMENTS

| | | | | |
|---|---|---|---|---|
| 4,427,987 A | * | 1/1984 | Kikuchi | 346/74.4 |
| 4,731,524 A | * | 3/1988 | Brooks | 235/432 |
| 5,382,963 A | * | 1/1995 | Pond et al. | 346/25 |
| 5,542,487 A | * | 8/1996 | Schultz et al. | 178/4.1 A |
| 6,139,139 A | | 10/2000 | Stoffel et al. | |
| 6,254,218 B1 | | 7/2001 | Suzuki et al. | |
| 6,344,303 B1 | * | 2/2002 | Takahashi | 430/253 |
| 6,530,647 B2 | | 3/2003 | Kubota et al. | |
| 6,561,635 B1 | * | 5/2003 | Wen | 347/85 |

* cited by examiner

*Primary Examiner*—Hai Pham

(57) ABSTRACT

A flexible media magnetic printing system provides for data storage within flexible media imprinted with magnetic ink. In a particular embodiment, the printing system includes at least one reservoir of magnetic ink with magnetic particles capable of supporting high density data, and at least one reservoir of visible ink. The reservoirs are coupled to a print head including one or more ink-ejecting nozzles, which is removably or fixedly coupled to at least one magnetic read/write device. The magnetic read/write device tracks above the magnetic ink applied by the ink-ejecting nozzles to the flexible media. The magnetic read/write device writes to the magnetic ink by providing a magnetic field of sufficient intensity to re-orient the magnetic alignment within the ink to a known direction. The magnetic read/write device also reads data from flexible media, for example, paper or cloth that is imprinted with data-embedded magnetic ink. Visible or substantially invisible magnetic ink may be applied as dots within or strips beneath characters printed in visible ink. An inkjet printer head incorporating the flexible media magnetic printing system is further provided.

42 Claims, 4 Drawing Sheets

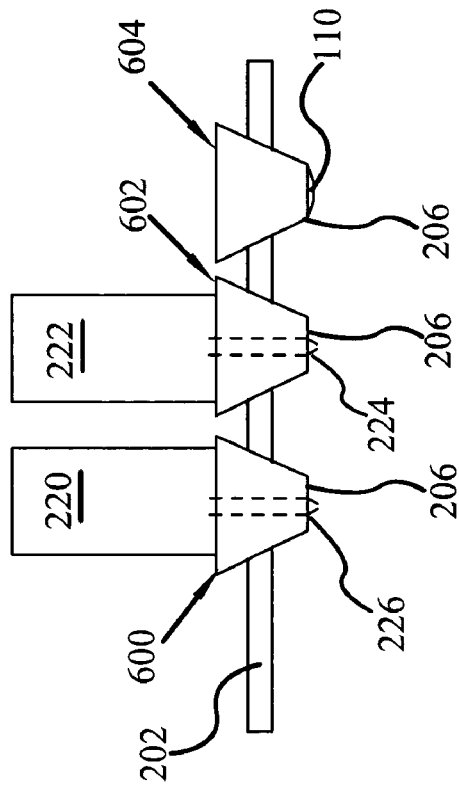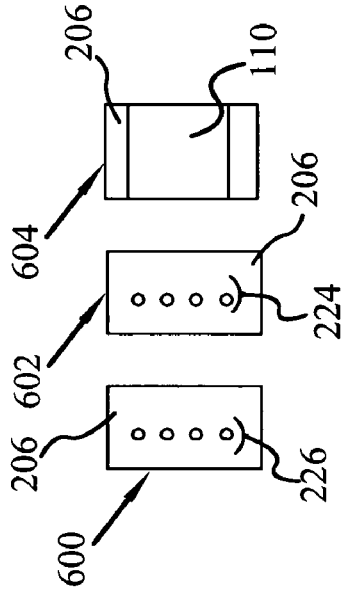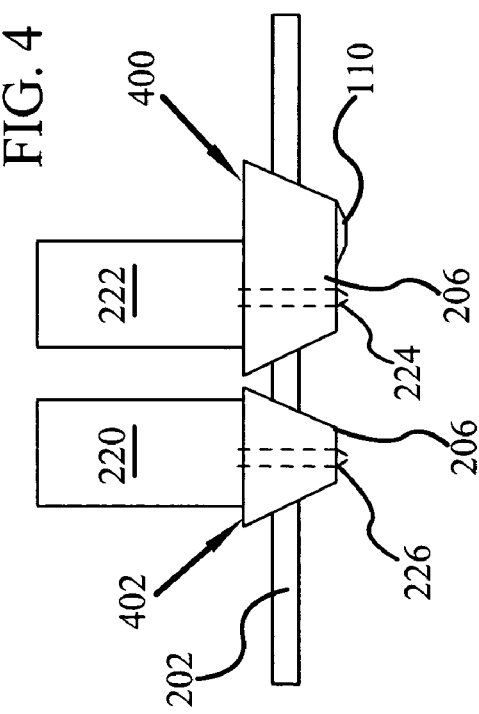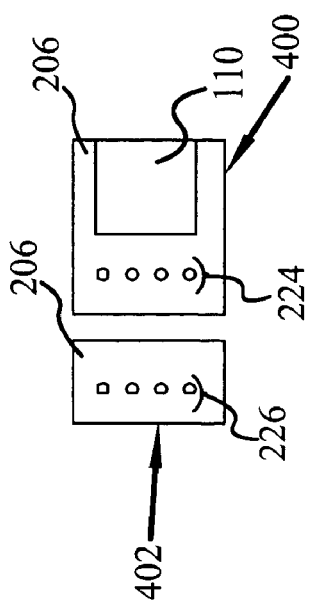

FLEXIBLE MEDIA MAGNETIC PRINTING SYSTEM

FIELD OF THE INVENTION

The present invention relates generally to data storage and in particular to a printer system applying magnetic print material to flexible media such as cloth or paper.

BACKGROUND

Today's computer systems are becoming increasingly sophisticated, permitting users to perform an ever increasing variety of computing tasks at faster and faster rates. Data storage and retrieval are two issues involved in nearly every computer operation.

Hard copy and soft copy are terms generally applied to distinguish between printed materials and electronic copies. To be non-volatile, the soft copy/electronic copy is traditionally stored in an appropriate data storage media.

Traditional forms of electronic data storage rely upon writing media set down with rigid devices, such as the magnetic media utilized in hard drives, floppy drives and magnetic tape. In a great many instances, a printed representation of the stored data is created, for example, in a textual document, graphic, chart, table or photograph.

Unlike a computer, a printed document does not require a continuous source of power to be enjoyed. Documents printed on paper are also portable and easily passed from one person to another. Yet, in many instances it is desirable to provide the recipient of a hard copy with the corresponding electronic soft copy as well. At least two issues arise in such a setting.

First, the provider of the data must have at his or her disposal an appropriate media for receiving the electronic copy of the information—a removable hard drive, floppy disc, cassette tape, writeable DVD or CD, zip drive, ram drive or other physical device capable of holding electronic data.

In most cases, such devices must be acquired for a price from a third party supplier or manufacturer. More specifically, regardless of a desire to do so, the general user is not capable of rendering a storage device on his or her own.

The manufacturing costs and technology involved in fabrication place the generation of traditional data storage devices out of the realm of financial feasibility for the typical user. Although costs for general storage devices have decreased, a user may incur significant aggregate costs over time in continuously utilizing electronic file storage devices.

Second, transferring a second item (i.e., the device containing the electronic copy) in addition to the paper hard copy presents its own problems. The recipient must take care not to loose, or misplace the electronic copy. Yet, in many cases the electronic copy is not stored, carried with, or otherwise tied to the paper copy. Frequently paper and electronic copies are stored in physically different archives.

Another undesirable factor inherent in separate physical storage devices, such as floppy discs or other devices, is the creation of excess waste. When a user saves an electronic copy of a document or file to a floppy disc, the unused portion of the disc is wasted. This represents further waste of the resources used in creating the disc itself.

Printer devices such as ink-jet printers and laser printers have become increasingly more common and specialized in terms of their quality of resolution. Photo-quality images such as would have required a photo lab a few years ago are now commonly printed by computer users. With laser printing generally being on the order of 1200 DPI (dots per inch) and ink-jet reaching 4800 or greater, the quality of either system has advanced significantly from the early days of fuzzy dots suggesting the outlines of letters, characters or other shapes. By and large the granularity of ink-jet printing has provided an extremely cost effective way to render sharper images.

The direct result of such printer device capability is that hard copy versions of data are increasingly more precise and capable of conveying visual information with greater resolution and clarity. To some extent, this leads users to be more prolific in their printing efforts, both for their own use as well as in printing for dissemination to others.

If the user is working with multiple versions of a document, image, picture, or other physically tangible form of the data, the issue of a paper copy and a separate electronic copy may become both complex and confusing. As such, a user may open an electronic copy that does not correspond to the print copy he or she is working with. This introduces an opportunity for error within the data as the user makes changes. In addition, there is the prospect of additional time lost in sorting and comparing electronic and hard copies. These issues of lost time and data error potentially carry an economic cost.

Hence, there is a need for a data storage device that overcomes one or more of the drawbacks identified above.

SUMMARY

The present disclosure advances the art and overcomes problems articulated above by providing a flexible magnetic media printing and data storage system.

In particular and by way of example only, according to an embodiment of the present invention, this invention provides a flexible media magnetic printing system including: a case; a printer device disposed at least partially within the case having a print material applicator; at least one reservoir of magnetic print material coupled to the printer, the magnetic print material including magnetic particles capable of supporting high density data, and at least one magnetic read/write device coupled to the printer device proximate to a print material applicator.

In yet another embodiment, the invention may provide a flexible media magnetic printing system including: a case; a print head having at least one ink-ejecting nozzle, the print head disposed at least partially within the case; at least one reservoir of visible ink coupled to the print head; at least one reservoir of magnetic ink coupled to the print head, the magnetic ink including magnetic particles capable of supporting high density data, and at least one magnetic read/write device coupled to the print head proximate to the ink-ejecting portion of the print head.

BRIEF DESCRIPTION OF THE DRAWINGS

FIGS. 4 through 7 provide plan and first side views of magnetic inkjet printer devices according to alternative embodiments.

DETAILED DESCRIPTION

Before proceeding with the detailed description, it is to be appreciated that the present teaching is by way of example, not limitation. The concepts herein are not limited to use or application with a specific type of flexible media magnetic printing system. Thus, although the instrumentalities described herein are for the convenience of explanation, shown and described with respect to exemplary embodiments, it will be appreciated that the principals herein may be equally applied in other types of flexible media magnetic printing.

Figure 1:
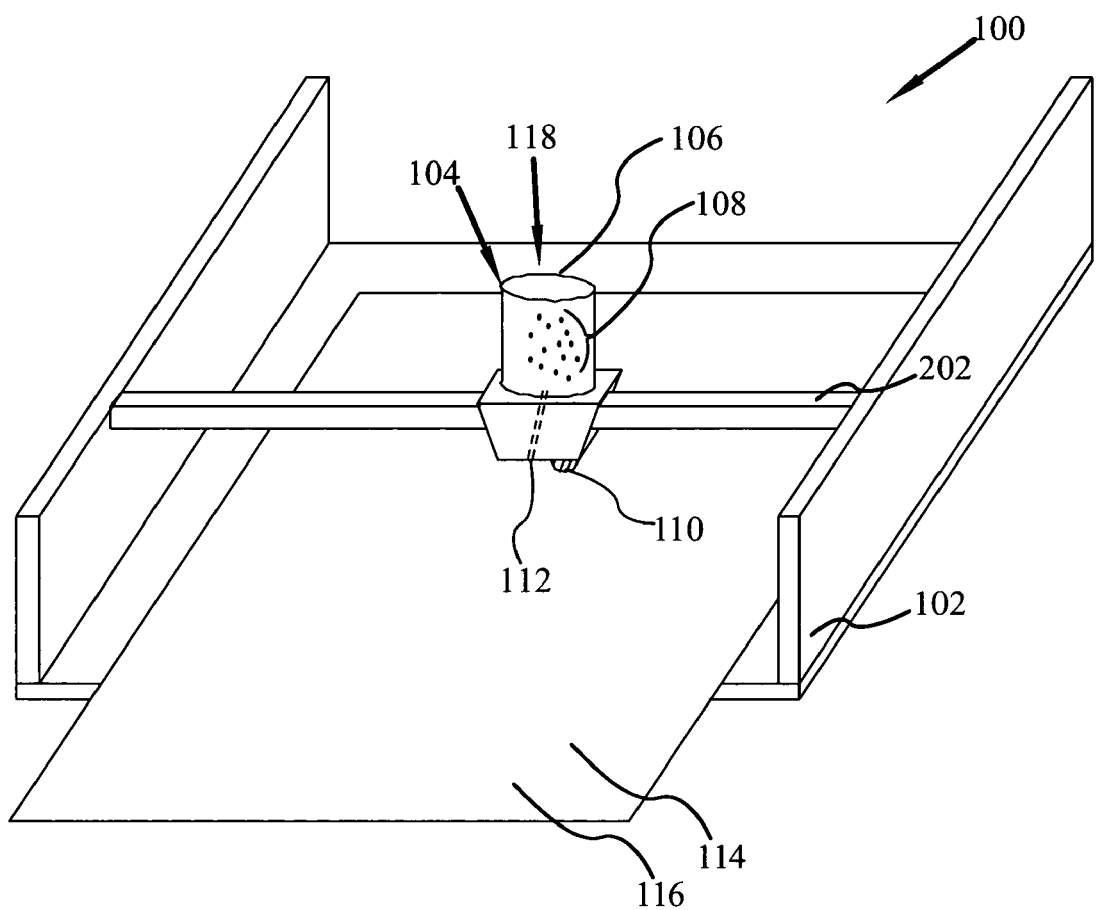
FIG. 1 is a partial perspective view of a flexible media magnetic printing system according to one embodiment.

Referring now to the drawings, and more particularly FIG. 1, there is shown a portion of a flexible media magnetic printing system 100, having a case 102, a printer device 104, a reservoir 106 of magnetic print material 108 coupled to the printer device 104, and at least one magnetic read/write device 110. The printer device 104 has a print material applicator 112. The magnetic read/write device 110 is coupled to the printer device 104 such that it is proximate to the print material applicator 112. A flexible media 114 is presented to printer device 104 for receiving magnetic print material 108. In at least one embodiment, the flexible media 114 presented to the printer device 104 is paper 116.

The data writing ability of the flexible media magnetic printing system 100 is at least in part advantageously achieved by the magnetic print material 108. More specifically, the magnetic print material 108 includes magnetic particles capable of supporting high density data. In much the same way as a floppy disc provides circular tracks of magnetic media for data storage, the magnetic print material 108, as set down on the flexible media 114, provides linear data tracks that may be used for data storage.

Modern printing technology affords a wide selection of high resolution and low cost printing options that may be utilized with magnetic print material 108. For example, magnetic print material 108 may be combined with traditional laser toner for use in a laser printer, or provided as or within a separate toner reservoir, paralleling the use of multiple color toner reservoirs in color laser printing.

In light of the low cost, high precision and side-to-side movement of a thermal inkjet printer, in at least one alternative embodiment, the preferred printer device 104 is an inkjet printer device 118. It is understood and appreciated that as used herein, the term inkjet printer or printer device applies to the variety of thermal inkjet, piezoelectric inkjet, continuous flow inkjet, inkjet and other ink-based printing technologies involving a moving print head applying tiny amounts of ink to a print receiving surface.

Figure 2:
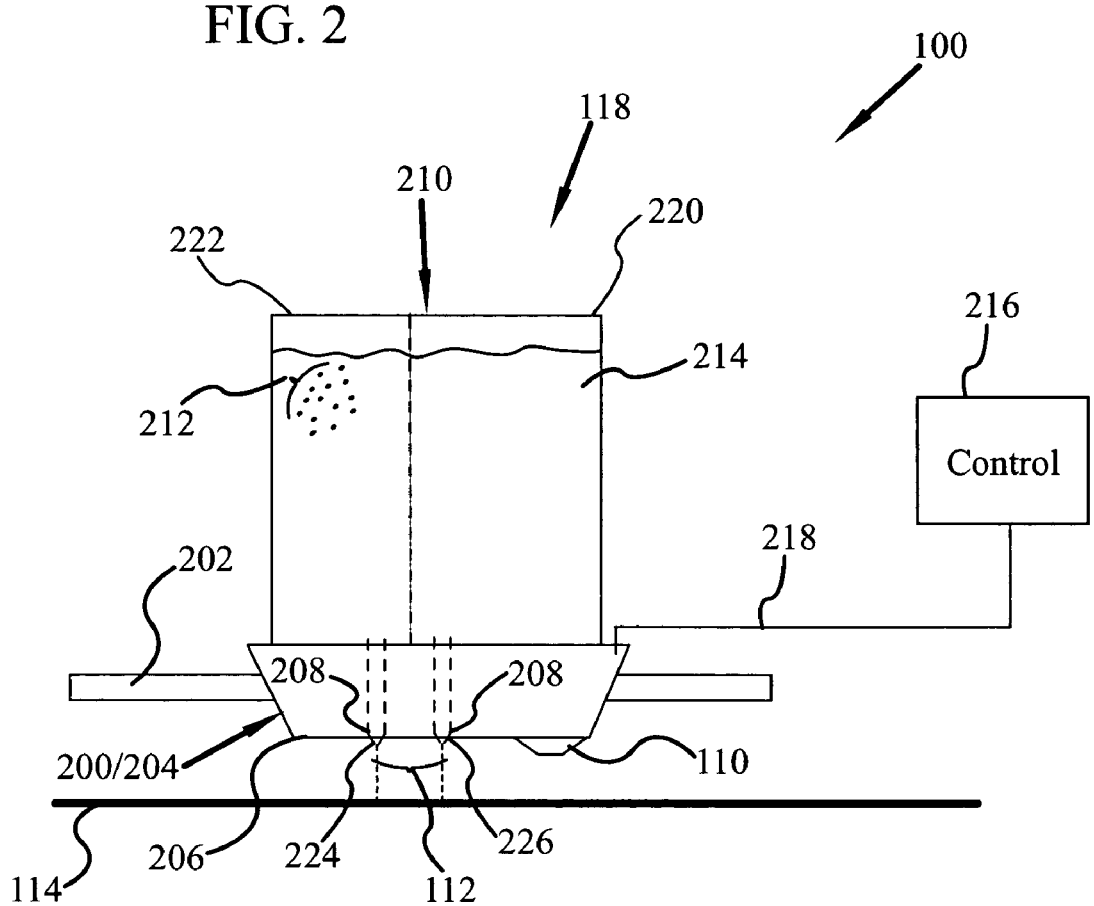
FIG. 2 is an enlarged plan view of a magnetic inkjet printer device according to one embodiment.

FIG. 2 conceptually illustrates an enlarged side view of printer device 104, further detailing an inkjet printer device 118 and print material applicator 112, as shown in FIG. 1. As shown, a movable base 200 is disposed at least partially within the case 102 (not shown) and movably coupled to a rail 202 or other appropriate lateral motion controller. The base 200 may at times be commonly referred to as a print head 204. The base 200 has a first side 206 oriented towards the flexible media 114 intended to receive print.

With an inkjet printing system, the ink applicator is generally referred to as an ink-ejecting nozzle. At least one ink-ejecting nozzle 208 is disposed within the first side 206 of the base 200 and oriented to provide ink to the provided flexible media 114. The ink-ejecting nozzle 208 is structured and arranged to receive ink from at least one reservoir 210 of ink.

Figure 3:
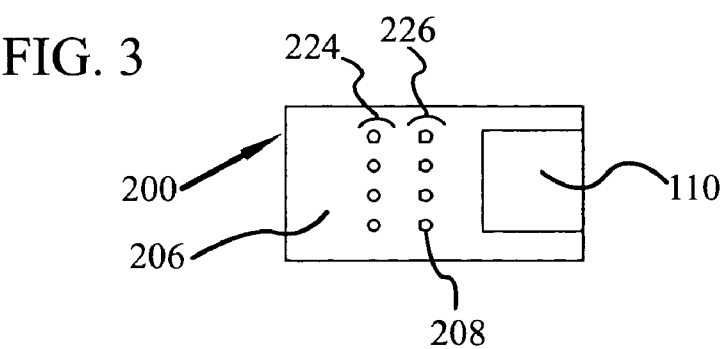
FIG. 3 is a plan view of the first side of the magnetic inkjet printer device shown in FIG. 2.

Under appropriate circumstances, a plurality of ink-ejecting nozzles 208 may be provided, as shown in FIG. 3, conceptually illustrating a plain view of the first side 206 of base 200. For conceptual simplicity and ease of discussion, FIG. 3 illustrates a plurality of parallel sets of four ink-ejecting nozzles 208.

It is understood and appreciated that under appropriate circumstances, each set may be comprised of more or less ink-ejecting nozzles 208, and or configured in a different pattern. In addition, the elements within the drawings are not necessarily to scale relative to one another.

At least one magnetic read/write device 110 is also provided, disposed within the first side 206 of at least one base 200. The magnetic read/write 110 device is substantially aligned with the ink-ejecting nozzle or nozzles 208, such that magnetic read/write device 110 follows the ink-ejecting nozzle(s) 208 along the surface of an ink receiving media. More specifically, the magnetic read/write device 110 will track above magnetic ink 212 ejected by the at least one ink-ejecting nozzle 208.

In at least one embodiment, the magnetic read/write device 110 is a magnetic read/write device such as a magneto-resistive head or giant mangneto-resistance head. Such types of read/write devices are commonly found within a typical hard drive and well understood in the field of data storage technology. Typically, hard drive read/write devices provide a single head with two independent circuits—one for reading and one for writing. Under appropriate circumstances, the read and write circuits may be divided and provided in physically separate components, either of which may be disabled during manufacturer. Briefly stated, the principle underlying the storage of data in magnetic media is the ability to change and/or reverse the relative orientation of magnetization of a storage bit (i.e. the logic state of a "0" or a "1").

A given magnetic particle generally has two magnetic axes—a hard axis transverse to an easy axis. The orientation of magnetization tends to prefer alignment along the easy axis. A convention is established to define an first orientation along the easy axis as a "0" and an opposite orientation along the easy axis as a "1". A magnetic bit is written to a magnetic particle or group of particles by providing a magnetic field of sufficient intensity to re-orient the magnetic alignment to a known direction.

A magnetic particle or group of particles may be sensed by a read device to reveal the encoded data bit by providing a magnetic sense layer in close proximity to the magnetic particles, the orientation of the sense layer of the read device being influenced by the magnetic orientation representing the stored data bit. The size and selection of an appropriate read/write device is a matter of fabrication preference and should not substantially alter the principles of operation described herein.

It is appreciated that in many inkjet systems, the ink-ejecting nozzle 208 and reservoir 210 are rigidly coupled together as an ink cartridge which may be snapped, plugged or otherwise non-permanently attached to the movable base 200 for the purposes of printing, and replaced as a unit when the reservoir 210 runs dry. The presence of the at least one ink-ejecting nozzle 208 as a lasting component of the base 200 or as a component coupled to the removable reservoir 210 is a matter of design fabrication preference.

In at least one embodiment, magnetic print material 108 is magnetic ink 212. The magnetic ink 212 may be combined with a visible ink 214, the visible ink 214 and magnetic ink 212 being ejected through the same ink-ejecting nozzle 208. Moreover, the magnetic ink 212 may be substantially invisible. The visible ink 214 may be black ink or colored ink. In applications where colored ink is used, the visible colored ink may be a combination of several separate ink components, such as for example, Red/Green/Blue or Cyan/Magenta/Yellow, as are commonly used in color inkjet printing. As the magnetic print material 108 is present in magnetic ink 212, the same technology used to apply visible ink 214 may be advantageously relied upon for the application of the magnetic ink 212. More specifically, a control logic 216 communicates with the base 200 by wiring harness 218, to control ink-ejecting nozzle(s) 208.

The visible ink 214 may be provided by at least one reservoir 220 of visible ink coupled to the base 200. The magnetic ink 212 may be provided by at least one reservoir 222 of magnetic ink coupled to the base 200. The combination of inks may also be accomplished by providing at least one combined reservoir 210 containing both the visible and magnetic inks 214 and 212.

In an alternative embodiment, the magnetic ink 212 may be ejected from a magnetic ink-ejecting nozzle 224 or set of magnetic ink-ejecting nozzles 224 that are separate from a visible ink-ejecting nozzle 226 or set of visible ink-ejecting nozzles 226. As shown in FIGS. 2 and 3 the magnetic ink-ejecting nozzle(s) 224 is to the left of the visible ink-ejecting nozzle(s) 226. The magnetic and visible ink-ejecting nozzles 224 and 226 may be reversed.

With reference to FIG. 3, the alignment of the magnetic and visible ink-ejecting nozzles 224 and 226 and the magnetic read/write device 110 may be more easily appreciated. For embodiments incorporating separate magnetic and visible ink-ejecting nozzles 224 and 226 for magnetic ink 212 and visible ink 214, respectively, sets of magnetic and visible ink-ejecting nozzles 224 and 226 are preferably aligned so that one ink may be printed atop the other, if so desired. The magnetic read/write device 110 is positioned proximate to and in alignment with the magnetic and visible ink-ejecting nozzles 224 and 226 such that it substantially tracks above the ejected magnetic or visible ink 212 or 214.

In at least one embodiment, the magnetic ink 212 is provided by a separate and replaceable reservoir 222. Such use of a separate reservoir advantageously conserves the magnetic ink resources when the user simply desires to print visible information. In addition, by providing magnetic ink 212 from a separate reservoir 222, the visible ink 214 may be provided by a commonly available reservoir 220, as may be used in a non magnetic printing system.

Moreover, as shown in FIGS. 2 and 3, in at least one embodiment the magnetic ink 212, visible ink 214 and at least one magnetic read/write device 110 are disposed upon a single base 200. More specifically, a single integrated base 200 may provide the visible ink 214, magnetic ink 212 and the magnetic read/write device 110.

Alternatively, as conceptually illustrated in FIGS. 4 and 5, in an alternative embodiment the magnetic ink-ejecting nozzle 224 and the magnetic read/write device 110 are disposed upon a first base 800, and the visible ink-ejecting nozzle 226 is disposed in a second base 802. As illustrated, the first base 800 and second base 802 are substantially aligned such that they travel over the print receiving media in tandem, and the application of magnetic ink 212 and visible ink 214 may be made to substantially the same areas of the print-receiving flexible media 114.

In yet another alternative embodiment conceptually illustrated in FIGS. 6 and 7, the visible ink-ejecting nozzle 226, magnetic ink-ejecting nozzle 224 and the magnetic read/write device 110 are each disposed upon separate bases 600, 602, 604, respectively. The use of two or more separate bases to provide visible ink 214, magnetic ink 212 and magnetic read/write device 110 to the flexible media 114 advantageously permits the potential for a low cost upgrade to existing inkjet printers.

The side to side (i.e. lateral) motion of the base 200 easily provides for parallel tracks of applied magnetic ink 212, and more importantly, for the magnetic read/write head 110 to write data to the applied magnetic ink 212 in series. In at least one embodiment, the magnetic read/write device 110 is controlled by the control circuit 216, directing the application of ink. In the case of an upgraded inkjet printing system, or a system having multiple bases, the control of the read/write device 110 may be managed by a separate control system.

With respect to manufacturing costs and complexity, the use of two or more independently moving heads providing visible ink 214, magnetic ink 212 and magnetic read/write device 110 will typically require separate control circuits and greater system complexity. Combining the visible ink-ejecting nozzle 226, magnetic ink-ejecting nozzle 224 and magnetic read/write device 110 upon a single base, system complexity and control may be significantly reduced. Where separate bases are employed (800, 802, 600, 602, 604), in at least one embodiment the multiple bases are physically coupled such that their movement is synchronized and controlled by a single controller and or control logic 216.

As such, in at least one embodiment, the use of parallel tracks of applied magnetic ink 212 is preferred. However, under appropriate circumstances, the magnetic ink 212 may be applied so as to ultimately produce a circle, in the substantially the same manner by which an inkjet printer is capable of printing objects that are not confined to a single straight strip of ink, such as squares, circles, ovals, chart lines, etc. . . . .

The application of the magnetic ink 212 to the flexible media 114 may be performed so as to create a continuous strip of magnetic material across the surface of the flexible media 114, paralleling the lateral motion of the base 200 and the magnetic ink-ejecting nozzle 224. Under appropriate circumstances, the individual strips of magnetic ink 212 may be combined into larger blocks of magnetic material.

In an alternative embodiment, the precision of the inkjet printer control over the magnetic ink-ejecting nozzle 224 permits the magnetic ink 212 to be applied as individual dots at a predetermined interval spacing, the spacing selected to avoid the magnetic ink dots joining together. The predetermined spacing and size of the individual dots serves to pre-define the storage format.

Use of a magnetic read/write device 110 to read or write data to magnetic material (i.e., magnetic print material 108) is well understood in the art of data storage technology. In at least one embodiment, data may be written or read from the applied magnetic ink 212 in substantially the same way a read/write head is directed to interact with other, more traditional magnetic media. More specifically, in at least one embodiment, "off-the shelf" technology with respect to ink-ejecting nozzles and read/write heads may be combined to provide the new, novel and non-obvious magnetic printing system 100.

As stated above, in at least one embodiment, the magnetic ink-ejecting nozzle 224 applying the magnetic ink 212 is substantially aligned with the visible ink-ejecting nozzle 226 applying the visible ink 214. Alternatively, the same nozzle or nozzles are used to eject magnetic ink 212 and visible ink 214, or a visible ink 214 containing the appropriate magnetic particles for data storage.

As such, during a print operation, magnetic ink 212 may be applied to an ink receiving medium such as flexible media 114 in substantially the same area to which visible ink 214 is applied. More specifically, during a print operation, the printer may overlay ejected magnetic ink 212 with ejected visible ink 214, or visa-versa. In at least one embodiment, such concurrent placement of visible ink 214 and magnetic ink 212 is preferred.

Figure 8:
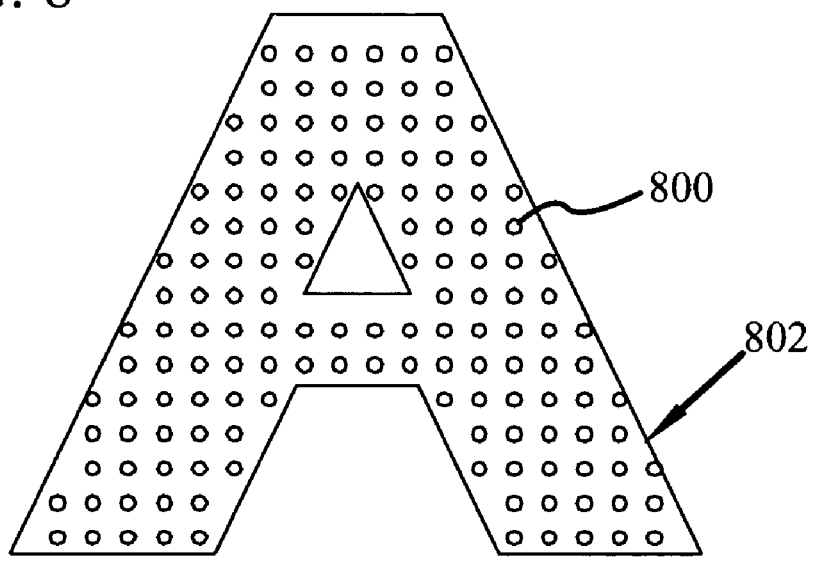
FIGS. 8 and 9 illustrate the relationship of magnetic ink and visual ink according to an embodiment.

As shown in FIG. 8, magnetic ink dots 800 (formed of magnetic ink 212) have been set down substantially within a visible character 802. For the sake of understanding the placement of the magnetic ink dots 800, visible character 802 has not been substantially filled in or otherwise shaded within the character defining border.

Such co-location of visible and magnetic ink advantageously permits the data storage capability of the flexible media 114 to be substantially non-evident to the eye of a party visually observing the media. Additionally, protection of stored data is advantageously provided when magnetic kink dots 800 are set down beneath a layer or coating of visible ink 214.

Figure 9:
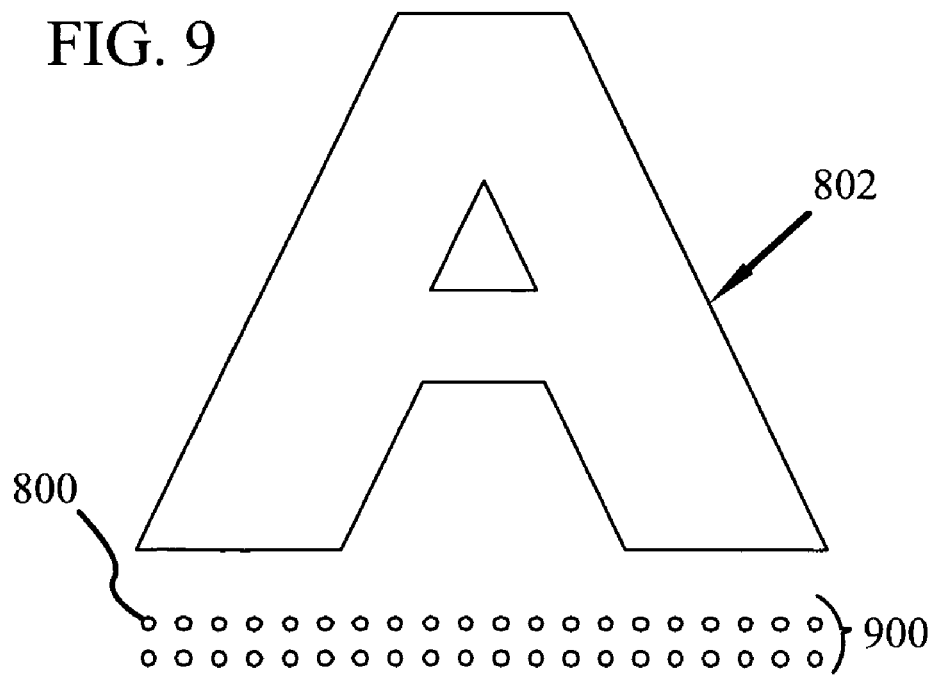

In an alternative embodiment shown in FIG. 9, in addition to or as an alternative, the magnetic ink dots 800 are shown as appearing below a text character in strip 900. In at least one embodiment, such strip 900 may be provided and visually indicated to help inform the user as to the presence of encoded data, or at the very least, the ability to provide encoded data within the flexible media 114.

The representation of the magnetic ink dots 800 as round dots is not intended to suggest or imply that the magnetic dots 800 should be substantially round in all cases. Under appropriate circumstances, such as for example to accommodate data strings of certain lengths, the separate ink dots 800 may be oval, tapered, rectangular or otherwise appropriately shaped. In addition, although illustrated as separate dots 800, it may be desirable for certain applications to provide a continuous strip, or large area of any particular shape of magnetic ink 212.

Where the magnetic ink dots 800 are intended to be invisible, and not merely concealed by visible ink 214, the type of magnetic print material 108 may impose size restrictions upon the size of the magnetic ink dots 800 and the density of the magnetic ink dots 800. In other words, if the physical size of the magnetic ink dots 800, and/or the density of the magnetic dots 800 is significantly increased, visibility of the magnetic ink 212 may occur.

In a similar fashion, the ejected magnetic ink 212 may be specifically concentrated in or as a graphic. Moreover, just as visible ink 214 may be applied to render a photograph, page of text, chart or other image, the application of the magnetic ink 212 to the flexible media is in general limited only by the physical limitations of the magnetic printing system 100.

Advances in magnetic particle fabrication and magnetic read/write devices now permit the storage of data at a nano-scaled level. Such minute granularity may not generally be necessary with respect to flexible media 114 such as paper.

The selection of appropriately sized magnetic particles and the density of these particles within the ink is generally driven by the density of data storage desired. In general, the particle size and density will be sufficient such that each typical 12 point character of Times New Roman text can store 1 to 2 bytes of information. Under appropriate circumstances, this storage capacity may be increased or decreased as required for specific applications.

As stated above, the magnetic read/write device 110 tracks above the ejected magnetic ink 212. As such, in operation, the read/write device 110 writes data to the ejected magnetic ink 212. In at least one embodiment, the magnetic ink is quick drying such that the magnetic read/write device 110 following behind the magnetic ink-ejecting nozzle 224 can proceed to write the data without a significant intervening drying time. Under appropriate circumstances, the magnetic ink 212 may be applied in preparation for the later storing of data. More specifically, simply because magnetic ink 212 is applied to the flexible media does not require that the magnetic read/write device 110 write data contemporaneously.

The use of flexible media such as traditional paper provides many advantages to users of the magnetic printing system 100. For example, the user need not buy a floppy disc or other physical device on which to store the soft copy of the data. A user can quite literally print himself or herself a floppy when and as needed.

Even more advantageously, the soft copy of the data and the hard copy of the data are integrated into a single physical item, thus significantly reducing if not otherwise eliminating the opportunity for confusion to arise in matching electronic copies to hard paper copies. In addition, if the user has the hard copy, then by implication, he or she also has the soft copy. Waste of resources is also curtailed as additional resources are not required for a separate data storage device.

Such integration of electronic data and visual data is most advantageous. Photographs may be printed that also include the necessary data for immediate reproduction without loss of resolution or complex processing. A sheet of music may contain a writing of the score along with the visual notes. A photo of an animal may contain an audio track of the animal in the wild, thereby permitting a user to further enhance his or her learning process beyond what mere text and pictures can provide.

The inherent initializing processes performed by an inkjet printer to accept a piece of print media, such as paper, and align the printing base relative to the media edges is advantageously utilized by the magnetic printing system 100. In addition to writing data to the magnetic ink 212 in an initial printing operation, the media alignment process permits the magnetic printing system 100 to advantageously operate as a reader, scanner, writer, re-writer. More specifically, the lateral motion of the base with the read/write device 110 permits the magnetic printing system 100 to track, read and re-write previously written data from a flexible media on which magnetic ink 212 has been ejected in a known format.

It is further understood and appreciated that any media which is compatible with a traditional inkjet printer may be compatible with the magnetic printing system 100 incorporating inkjet technology. As such, paper, cloth, adhesive labels and a variety of other ink receiving media may be utilized.

In addition, special paper is often preferred for photo printing as it is less prone to permit bleeding of the applied ink, thus providing greater precision in the application of the visible ink 214 and/or the avoidance of fuzziness born of the applied ink dots bleeding together. Where the density of data storage upon the flexible media 114 is at least in part based upon the size of the magnetic ink dots 800, the use of non-bleeding photo paper can advantageously permit greater data density by reducing bleeding of the magnetic ink. In other words, the user of a magnetic printing system 100 may advantageously vary the resolution of the magnetic printing, reading and writing by selecting different grades of paper or other ink receiving media.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

We claim:

1. A flexible media magnetic printing system comprising:
   a case;
   a printer device disposed at least partially within the case having a print material applicator;
   at least one reservoir of magnetic print material coupled to the printer device, the magnetic print material including magnetic particles capable of supporting high density data represented as oriented magnetic fields; and
   at least one magnetic read/write device coupled to the printer device proximate to a print material applicator, the printer device operable to apply the magnetic print material to a flexible media as individual dots at a predetermined interval spacing, each dot having a separate magnetic field.

2. The flexible media magnetic printing system of claim 1, wherein the printer device further comprises at least one inkjet printer head and the magnetic print material comprises magnetic ink.

3. The flexible media magnetic printing system of claim 1, wherein the printer device comprises a thermal transfer printer.

4. The flexible media magnetic printing system of claim 1, wherein the printer device comprises a laser printer device and the magnetic print material comprises magnetic toner.

5. The flexible media magnetic printing system of claim 1, further including a flexible media set to receive magnetic print material as applied by the print material applicator.

6. The flexible media magnetic printing system of claim 5, wherein the flexible media comprises paper.

7. A flexible media magnetic printing system comprising:
   a case;
   a print head having at least one ink-ejecting nozzle, the print head disposed at least partially within the case;
   at least one reservoir of visible ink coupled to the print head;
   at least one reservoir of magnetic ink coupled to the print head, the magnetic ink including magnetic particles capable of supporting high density data; and
   at least one magnetic read/write device coupled to the print head proximate to the ink-ejecting portion of the print head.

8. The flexible media magnetic printing system of claim 7, wherein the print head further includes separate ink-ejecting nozzles for ejecting the visible ink and the magnetic ink.

9. The flexible media magnetic printing system of claim 7, wherein the same at least one ink-ejecting nozzle receives visible ink and magnetic ink.

10. The flexible media magnetic printing system of claim 7, wherein the reservoir of visible ink and the reservoir of magnetic ink comprise a combined reservoir.

11. The flexible media magnetic printing system of claim 7, wherein the print head is operable during a print operation such that magnetic ink is applied to an ink receiving media in substantially the same area as to which visible ink is applied.

12. The flexible media magnetic printing system of claim 7, wherein the print head is operable during a print operation to overlay ejected magnetic ink with ejected visible ink.

13. The flexible media magnetic printing system of claim 7, wherein the magnetic ink is substantially invisible.

14. The flexible media magnetic printing system of claim 7, wherein the print head is operable during a print operation such that the at least one magnetic read/write device writes data to ejected magnetic ink.

15. The flexible media magnetic printing system of claim 7, wherein the magnetic ink is applied as individual dots at a predetermined interval spacing, the spacing selected to substantially avoid the magnetic ink dots joining together.

16. The flexible media magnetic printing system of claim 7, wherein the print head is operable during a print operation to apply magnetic ink and write data within the applied ink upon traditional paper media.

17. The flexible media magnetic printing system of claim 7, wherein the at least one magnetic read/write device is aligned with the at least one ink-ejecting nozzle such that the at least one magnetic read/write device substantially tracks above magnetic ink ejected by the at least one ink-ejecting nozzle.

18. The flexible media magnetic printing system of claim 7, wherein the visual ink is black ink.

19. The flexible media magnetic printing system of claim 7, wherein the visual ink comprises color ink.

20. The flexible media magnetic printing system of claim 7, further including a flexible media set to receive magnetic ink as applied by ink-ejecting nozzle.

21. The flexible media magnetic printing system of claim 20, wherein the flexible media comprises paper.

22. A flexible media magnetic printing system comprising:
   a case;
   at least one movable base disposed at least partially within the case, the base having a first side oriented towards provided ink receiving media;
   at least one visible ink-ejecting nozzle disposed within the first side of the at least one movable base, the at least one visible ink-ejecting nozzle structured and arranged to receive visible ink from at least one reservoir of visible ink disposed within the case;
   at least one magnetic ink-ejecting nozzle disposed within the first side of at the least one movable base, the at least one magnetic ink-ejecting nozzle structured and arranged to receive magnetic ink from at least one reservoir of magnetic ink disposed within the case; the magnetic ink including magnetic particles capable of supporting high density data; and
   at least one magnetic read/write device at least partially disposed within the first side of the at least one movable base.

23. The flexible media magnetic printing system of claim 22, wherein the at least one visible ink-ejecting nozzle, the at least one magnetic ink-ejecting nozzle and the at least one magnetic read/write device are disposed upon a single base.

24. The flexible media magnetic printing system of claim 22, wherein the at least one magnetic ink-ejecting nozzle and the at least one magnetic read/write device are disposed upon a first base, the at least one visible ink-ejecting nozzle being disposed upon at least one second base.

25. The flexible media magnetic printing system of claim 22, wherein a separate base is provided for each set of components: the at least one visible ink-ejecting nozzle, the at least one magnetic ink-ejecting nozzle and the at least one magnetic read/write device.

26. The flexible media magnetic printing system of claim 22, wherein the at least one visible ink-ejecting nozzle and the at least one magnetic ink-ejecting nozzle are the same at least one ink-ejecting nozzle.

27. The flexible media magnetic printing system of claim 22, wherein the reservoir of visible ink and the reservoir of magnetic ink comprise a combined reservoir.

28. The flexible media magnetic printing system of claim 22, wherein the printing system is operable during a print operation such that magnetic ink is applied to an ink receiving media in substantially the same area to which visible ink is applied.

29. The flexible media magnetic printing system of claim 22, wherein the printing system is operable during a print operation to overlay ejected magnetic ink with ejected visible ink.

30. The flexible media magnetic printing system of claim 22, wherein the magnetic ink is substantially invisible.

31. The flexible media magnetic printing system of claim 22, wherein the printing system is operable during a print operation such that the at least one magnetic read/write device writes data to ejected magnetic ink.

32. The flexible media magnetic printing system of claim 22, wherein the magnetic ink is applied as individual dots at a predetermined interval spacing, the spacing selected to substantially avoid the magnetic ink dots joining together.

33. The flexible media magnetic printing system of claim 22, wherein the printing system is operable during a print operation to apply magnetic ink and write data within the applied ink upon traditional paper media.

34. The flexible media magnetic printing system of claim 22, further including a flexible media set to receive magnetic ink as applied by the ink-ejecting nozzle.

35. The flexible media magnetic printing system of claim 34, wherein the flexible media comprises paper.

36. An inkjet printer head comprising:
a base having an ink ejecting side and an ink receiving side, the ink receiving side structured and arranged to receive visual ink and magnetic ink from at least one ink reservoir;
at least one visible ink-ejecting nozzle disposed within the ink ejecting side;
at least one magnetic ink-ejecting nozzle disposed within the ink ejecting side; and
at least one magnetic read/write device at least partially disposed within the ink ejecting side, proximate to the at least one magnetic ink-ejecting nozzle.

37. The inkjet printer head of claim 36, wherein the at least one visible ink-ejecting nozzle, magnetic ink-ejecting nozzle and magnetic read/write device are substantially aligned to follow one another over the surface of an ink receiving media.

38. The inkjet printer head of claim 36, further including at least one reservoir of visible ink and at least one reservoir of magnetic ink, the magnetic ink including magnetic particles capable of supporting high density data.

39. The inkjet printer head of claim 36, wherein the printer head is operable during a print operation such that magnetic ink is applied to an ink receiving media in substantially the same area to which visible ink is applied.

40. The inkjet printer head of claim 36, wherein the printer head is operable during a print operation to overlay ejected magnetic ink with ejected visible ink.

41. The inkjet printer head of claim 36, wherein the printer head is operable during a print operation to apply magnetic ink and write data within the applied ink upon traditional paper media.

42. The inkjet printer head of claim 36, wherein the printer head is operable during a print operation such that the at least one magnetic read/write device writes data to ejected magnetic ink.

* * * * *